(12) United States Patent
Kasagi et al.

(10) Patent No.: US 10,433,366 B2
(45) Date of Patent: Oct. 1, 2019

(54) MEASUREMENT DEVICE AND MEASUREMENT METHOD

(71) Applicant: ANRITSU CORPORATION, Kanagawa (JP)

(72) Inventors: Takahiro Kasagi, Kanagawa (JP); Masahiro Aoyama, Kanagawa (JP); Custodio Jean-Elaine Garcia, Kanagawa (JP); Takashi Yanagimoto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/964,269

(22) Filed: Apr. 27, 2018

(65) Prior Publication Data
US 2018/0352606 A1 Dec. 6, 2018

(30) Foreign Application Priority Data

Jun. 5, 2017 (JP) ................................ 2017-110980

(51) Int. Cl.
*H04W 84/12* (2009.01)
*H04W 74/08* (2009.01)
(Continued)

(52) U.S. Cl.
CPC ........... *H04W 84/12* (2013.01); *H04L 1/1854* (2013.01); *H04L 1/1867* (2013.01); *H04L 1/24* (2013.01); *H04W 74/0816* (2013.01); *H04L 1/0003* (2013.01); *H04L 1/0015* (2013.01); *H04W 24/06* (2013.01)

(58) Field of Classification Search
CPC . H04W 84/12; H04W 74/0816; H04W 24/06; H04L 1/18; H04L 1/0015; H04L 5/0046; H04L 1/0003; H04L 5/006; H04L 5/0042; H04L 1/0026; H04L 1/0009; H04L 5/0007
See application file for complete search history.

(56) References Cited

U.S. PATENT DOCUMENTS 7,542,433 B2 * 6/2009 Miyoshi ............... H04B 7/2659
370/255
7,986,620 B2 * 7/2011 Hamada ............... H04B 1/7113
370/229
(Continued)

FOREIGN PATENT DOCUMENTS

JP 2016-163290 A 9/2016

*Primary Examiner* — Dady Chery
(74) *Attorney, Agent, or Firm* — Pearne & Gordon LLP

(57) ABSTRACT

A measurement device 10 includes a reception unit 13*b* that receives a frame transmitted from a DUT 1, an MCS determination unit 17*a* that determines whether or not a received MCS index of a frame received by the reception unit 13*b* matches a predetermined MCS index for comparison, a transmission unit 13*a* that transmits a notification signal to the DUT when the MCS determination unit 17*a* determines that the received MCS index matches the MCS index for comparison, and does not transmit the notification signal to the DUT when the MCS determination unit 17*a* determines that the received MCS index does not match the MCS index for comparison, and a measurement unit 14 that measures data under measurement included in the frame in which it is determined that the received MCS index matches the MCS index for comparison.

10 Claims, 8 Drawing Sheets

(51) Int. Cl.
   *H04L 1/18*   (2006.01)
   *H04L 1/24*   (2006.01)
   *H04W 24/06*  (2009.01)
   *H04L 1/00*   (2006.01)

(56) References Cited

U.S. PATENT DOCUMENTS

| | | | |
|---|---|---|---|
| 8,094,739 B2 * | 1/2012 | Nogami | H04L 1/0003 375/260 |
| 8,111,667 B2 * | 2/2012 | Shida | H04B 7/0413 370/334 |
| 8,451,955 B2 * | 5/2013 | Suga | H04L 1/0002 375/340 |
| 2006/0068825 A1 * | 3/2006 | Iochi | H04W 52/08 455/522 |

* cited by examiner

| HT MCS Index | Modulation scheme | Coding rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| Max VHT-MCS For 1 SS || Max VHT-MCS For 2 SS || Max VHT-MCS For 3 SS || Max VHT-MCS For 4 SS || Max VHT-MCS For 5 SS || Max VHT-MCS For 6 SS || Max VHT-MCS For 7 SS || Max VHT-MCS For 8 SS ||
| Bits: 2 || 2 || 2 || 2 || 2 || 2 || 2 || 2 ||

FIG. 3

| VHT MCS Index | Modulation scheme | Coding rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

FIG. 4

MEASUREMENT DEVICE AND MEASUREMENT METHOD

TECHNICAL FIELD

The present invention relates to a measurement device and a measurement method for measuring device under measurement that operates on the basis of, for example, a wireless LAN communication standard.

BACKGROUND ART

With the development of an information communication technology, various wireless communication technologies have been developed. For example, IEEE 802.11n is known as a communication standard regarding a wireless LAN technology among the technologies. In this IEEE 802.11n, application of a multiple inputs and multiplexed outputs (MIMO) technology in which multiplex antennas are used on both a transmitting side and a receiving side in order to support a high throughput (HT) with a data processing speed of 540 Mbps or more, minimize a transmission error, and optimize a data rate has been introduced.

In recent years, widespread use of the wireless LAN has been activated, and a new wireless LAN system for supporting a processing rate higher than a data processing speed supported by IEEE 802.11n is required, and a next generation wireless LAN system has been proposed as a next version of a IEEE 802.11n wireless LAN system. For example, IEEE 802.11ac is a new communication standard developed to support very high throughput (VHT).

In a communication standard such as IEEE802.11n or IEEE802.11ac, a combination of a modulation scheme and a coding rate can be selected using a modulation and coding scheme (MCS) in transmission of a data stream of a wireless LAN.

For example, in a communication system described in Patent Document 1, a base station device includes an MCS control unit that designates an MCS for each terminal device that is a destination, such that communication based on a communication standard of IEEE 802.11n is performed.

RELATED ART DOCUMENT

Patent Document

[Patent Document 1] JP-A-2016-163290

DISCLOSURE OF THE INVENTION

Problem that the Invention is to Solve

Incidentally, for example, when it is assumed that the terminal device described in Patent Document 1 is measured as a device under measurement, the device under measurement is caused to generate and transmit data with an arbitrary modulation scheme or an arbitrary coding rate desired by a user by setting an MCS on the basis of the communication standard of IEEE 802.11n, and characteristics of the device under measurement can be measured with the arbitrary modulation scheme or the arbitrary coding rate by analyzing the data.

However, for example, in the communication standard of IEEE802.11ac, since a standard regarding the MCS has been changed, it becomes difficult to measure characteristics of the device under measurement with an arbitrary modulation scheme or an arbitrary coding rate, and measures thereof are required.

The present invention has been made in view of the above circumstances, and an object of the present invention is to provide a measurement device and a measurement method capable of measuring characteristics of a device under measurement with an arbitrary modulation scheme or an arbitrary coding rate.

Means for Solving the Problem

A measurement device according to claim 1 of the present invention is a measurement device (10) including frame reception means (13*b*) for receiving a frame transmitted from a device under measurement (1), wherein the device under measurement transmits a frame generated using a predetermined modulation scheme and a predetermined coding rate to a transmission destination, and when the device under measurement does not receive a notification signal indicating that the frame has been received by the transmission destination, the device under measurement retransmits a frame in which at least one of the modulation scheme and the coding rate has been changed so that a probability of delivery to the transmission destination is increased; determination means (17*a*) for determining whether or not the modulation scheme and the coding rate of the frame received by the frame reception means satisfy a predetermined condition; notification signal processing means (13*a*) for transmitting the notification signal to the device under measurement when the determination means determines that the condition is satisfied and not transmitting the notification signal when the determination means determines that the condition is not satisfied; and measurement means for measuring data included in the frame transmitted from the device under measurement with the modulation scheme and the coding rate, the frame being determined to satisfy the condition by the determination means.

With this configuration, in the measurement device according to claim 1 of the present invention, since the notification signal is not transmitted to the device under measurement until at least one of the modulation scheme and the coding rate satisfies a predetermined condition, the device under measurement retransmits a frame in which at least one of the modulation scheme and the coding rate has been changed so that a delivery probability is increased until the device under measurement receives the notification signal.

As a result, in the measurement device according to claim 1 of the present invention, when at least one of the modulation scheme and the coding rate satisfies the predetermined condition, the frame can be set as a measurement target.

Therefore, the measurement device according to claim 1 of the present invention can measure the characteristics of the device under measurement with an arbitrary modulation scheme or an arbitrary coding rate.

The measurement device according to claim 2 of the present invention has a configuration in which the frame transmitted by the device under measurement includes information on a modulation and coding scheme index with which the modulation scheme and the coding rate are associated, the device under measurement retransmits a frame in which the value of the modulation and coding scheme index has been changed to a smaller value when the device under measurement does not receive the notification signal, the determination means determines whether the value of the modulation and coding scheme index matches a predetermined value, the notification signal processing means transmits the notification signal to the device under measurement when the determination means determines that the value of the modulation and coding scheme index matches the predetermined value, and the measurement means measures the data included in the frame in which the determination means determines that the value of the modulation and coding scheme index matches the predetermined value.

With this configuration, in the measurement device according to claim 2 of the present invention, since the data under measurement included in the frame in which the value of the modulation and coding scheme index is determined to match the predetermined value is measured, it is possible to measure the characteristics of the device under measurement with an arbitrary modulation scheme or an arbitrary coding rate.

The measurement device according to claim 3 of the present invention is a measurement device (20) including frame reception means (13*b*) for receiving a frame transmitted from a device under measurement (2), wherein the device under measurement transmits, to a transmission destination according to a frame request signal for requesting the frame, a frame generated on the basis of a value of a modulation and coding scheme index with which a modulation scheme and a coding rate are associated, and when the device under measurement does not receive a notification signal indicating that the frame has been received by the transmission destination, the device under measurement retransmits a frame in which a value of the modulation and coding scheme index has been changed; measurement means (14) for measuring data included in the frame, comparison means (21*a*) for comparing the modulation and coding scheme index of the frame received by the frame reception means with a predetermined value; notification signal processing means (21*b*) for transmitting the notification signal to the device under measurement when the comparison means determines that the modulation and coding scheme index is equal to or smaller than the predetermined value, and not transmitting the notification signal when the comparison means determines that the modulation and coding scheme index is not equal to or smaller than the predetermined value; request signal transmission means (13*c*) for transmitting the frame request signal to the device under measurement when the comparison means determines that the modulation and coding scheme index is smaller than the predetermined value; and measurement means for measuring data included in the frame when the comparison means determines that the value of the modulation and coding scheme index matches the predetermined value.

With this configuration, in the measurement device according to claim 3 of the present invention, since the data under measurement included in the frame in which the value of the modulation and coding scheme index is determined to match the predetermined value is measured, it is possible to measure the characteristics of the device under measurement with an arbitrary modulation scheme or an arbitrary coding rate.

The measurement device according to claim 4 of the present invention has a configuration in which the frame reception means receives, as the frame, a response frame that the device under measurement transmits according to a ping command, and the measurement means measures the data under measurement included in the response frame.

With this configuration, the measurement device according to claim 4 of the present invention can measure data under measurement included in the response frame that the device under measurement transmits in response to the ping command.

The measurement device according to claim 5 of the present invention has a configuration in which the frame reception means receives a frame conforming to the IEEE 802.11 standard as the frame.

With this configuration, the measurement device according to claim 5 of the present invention can measure data under measurement included in the frame conforming to the IEEE 802.11 standard.

A measurement method according to claim 6 of the present invention is a measurement method for measuring the device under measurement (1) using the measurement device (10) according to claim 1, and has a configuration in which the measurement method includes a frame reception step (S13) of receiving the frame transmitted from the device under measurement using the measurement device (10) according to claim 1; a determination step (S14) of determining whether or not the modulation scheme and the coding rate of the frame received in the frame reception step satisfy a predetermined condition, transmitting the notification signal to the device under measurement when it is determined that the condition is satisfied, and not transmitting the notification signal when it is determined that the condition is not satisfied; and a measurement step of measuring characteristics of the frame transmitted from the device under measurement with the modulation scheme and the coding rate, the frame being determined to satisfy the condition in the determination step.

With this configuration, in the measurement method according to claim 6 of the present invention, since the notification signal is not transmitted to the device under measurement until at least one of the modulation scheme and the coding rate satisfies a predetermined condition, the device under measurement retransmits a frame in which at least one of the modulation scheme and the coding rate has been changed so that a delivery probability is increased until the device under measurement receives the notification signal.

As a result, in the measurement method according to claim 6 of the present invention, when at least one of the modulation scheme and the coding rate satisfies the predetermined condition, the frame can be set as a measurement target.

Therefore, in the measurement method according to claim 6 of the present invention, it is possible to measure the characteristics of the device under measurement with an arbitrary modulation scheme or an arbitrary coding rate.

The measurement method according to claim 7 of the present invention has a configuration in which the frame transmitted by the device under measurement includes information on a modulation and coding scheme index with which the modulation scheme and the coding rate are associated, the device under measurement retransmits a frame in which the value of the modulation and coding scheme index has been changed to a smaller value when the device under measurement does not receive the notification signal, the determination step includes determining whether the value of the modulation and coding scheme index matches predetermined value, and transmitting the notification signal to the device under measurement when it is determined that the value of the modulation and coding scheme index matches the predetermined value, and the measurement step includes measuring the data included in the frame in which it is determined in the determination step that the value of the modulation and coding scheme index matches the predetermined value.

With this configuration, n the measurement method according to claim 7 of the present invention, since the data under measurement included in the frame in which the value of the modulation and coding scheme index is determined to match the predetermined value is measured, it is possible to measure the characteristics of the device under measurement with an arbitrary modulation scheme or an arbitrary coding rate.

A measurement method according to claim 8 of the present invention is a measurement method for measuring the device under measurement (2) using the measurement device (20) according to claim 3, and has a configuration in which the measurement method includes a frame reception step (S13) of receiving the frame transmitted from the device under measurement (2) using the measurement device according to claim 3; a comparison step (S21) of comparing the modulation and coding scheme index of the frame received in the frame reception step with a predetermined value; a notification signal processing step (S22) of transmitting the notification signal to the device under measurement when it is determined in the comparison step that the modulation and coding scheme index is equal to or smaller than the predetermined value; a request signal transmission step (S12) of transmitting the frame request signal to the device under measurement when it is determined in the comparison step that the modulation and coding scheme index is smaller than the predetermined value; and a measurement step of measuring data included in the frame when it is determined in the comparison step that the value of the modulation and coding scheme index matches the predetermined value.

With this configuration, in the measurement method according to claim 8 of the present invention, since the data under measurement included in the frame in which the value of the modulation and coding scheme index is determined to match the predetermined value is measured, it is possible to measure the characteristics of the device under measurement with an arbitrary modulation scheme or an arbitrary coding rate.

A measurement method according to claim 9 of the present invention is the measurement method, in which: the frame reception step includes receiving, as the frame, a response frame that the device under measurement transmits according to a ping command, and the measurement step includes measuring data included in the response frame.

A measurement method according to claim 10 of the present invention is the measurement method, in which the frame reception step includes receiving a frame conforming to the IEEE 802.11 standard as the frame.

Advantage of the Invention

The present invention can provide a measurement device and a measurement method which have an effect of being able to measure characteristics of a device under measurement with an arbitrary modulation scheme or an arbitrary coding rate.

BRIEF DESCRIPTION OF THE DRAWINGS

FIG. 3 is a diagram illustrating a configuration of "Rx VHT-MCS Map Subfield" included in a frame transmitted and received in conformance to a communication standard of IEEE 802.11ac.

FIG. 4 is a diagram illustrating an MCS in a communication standard of IEEE 802.11ac.

BEST MODE FOR CARRYING OUT THE INVENTION

First, a MCS will be described before embodiments of the present invention will be described. In this description, a communication standard of IEEE802.11n is abbreviated as "HT(11n)", and a communication standard of IEEE802.11ac is abbreviated as "VHT(11ac)".

Figures 1, 2:
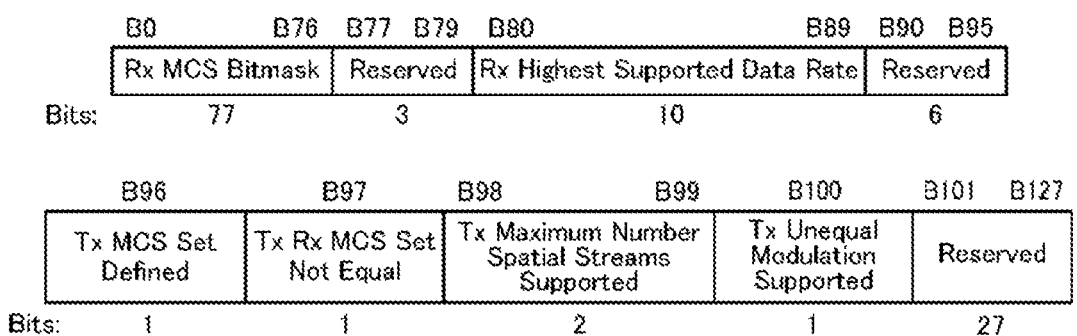
FIG. 1 is a diagram illustrating a configuration of "Supported MCS Set field" included in a frame transmitted and received in conformance to a communication standard of IEEE 802.11n.
FIG. 2 is a diagram illustrating MCS in a single stream in the communication standard of IEEE 802.11n.

FIG. 1 is a diagram illustrating a configuration of "Supported MCS Set field" included in frame that is transmitted and received according to HT(11n). In a specification as illustrated in FIG. 1, the "Supported MCS Set field" includes an area of "Rx MCS Bitmask" in 77 bits including B0 to B76, such that 77 types of MCS can be set.

FIG. 2 illustrates eight types of MCSs for a single stream of which the number of spatial streams is one among 77 types of MCS configurable according to HT(11n). As illustrated in FIG. 2, in the specification, a modulation scheme and a coding rate are combined, and a desired combination can be designated by a MCS index. As illustrated in FIG. 2, in the specification, a delivery probability increases as the value of the MCS index is decreased.

In FIG. 2, for example, when MCS index=0 (MCS 0) with the modulation scheme BPSK and the coding rate of 1/2 is designated, this can be realized by setting a bit B0 in the "Rx MCS Bitmask" area illustrated in FIG. 1. That is, in the specification of HT(11n), a desired modulation scheme and a desired coding rate can be set by setting only the bit of the desired MCS index of "Rx MCS Bitmask" to 1 (Supported) and setting other bits to 0 (Not Supported).

FIG. 3 is a diagram illustrating a configuration of "Rx VHT-MCS Map Subfield" included in a frame that is transmitted and received according to VHT(11ac). As illustrated in FIG. 3, in the specification of VHT(11ac), MCS can be set for each number of spatial streams. Specifically, for example, a single stream of which the number of spatial streams is one can be set in two bits B0 and B1 and, for example, MCS in a stream (MIMO) of which the number of spatial streams is eight can be set in two bits B14 and B15. In the specification of VHT(11ac), ten types of MCSs 0 to 9 can be set for each number of spatial streams, as illustrated in FIG. 4. As illustrated in FIG. 4, a delivery probability increases as the MCS index decreases.

However, in "Rx VHT-MCS Map Subfield" of VHT (11ac), a desired MCS index is likely to be unable to be represented in a format of "Supported" or "Not supported" as in "Rx MCS Bitmask" of HT(11n). This is because, specifically, in the specification of VHT(11ac), VHT-MCS 0 to 7 are represented in an 00B (binary number) setting, VHT-MCS 0 to 8 are represented in in a 01B setting, VHT-MCS 0 to 9 are represented in in a 11B setting, and only the three types can be represented.

Therefore, as described in the unit "Problem that the Invention is to Solve", it is difficult to measure characteristics of a device under measurement with an arbitrary modulation scheme or an arbitrary coding rate in a next-generation communication standard such as IEEE802.11ac.

Figure 5:
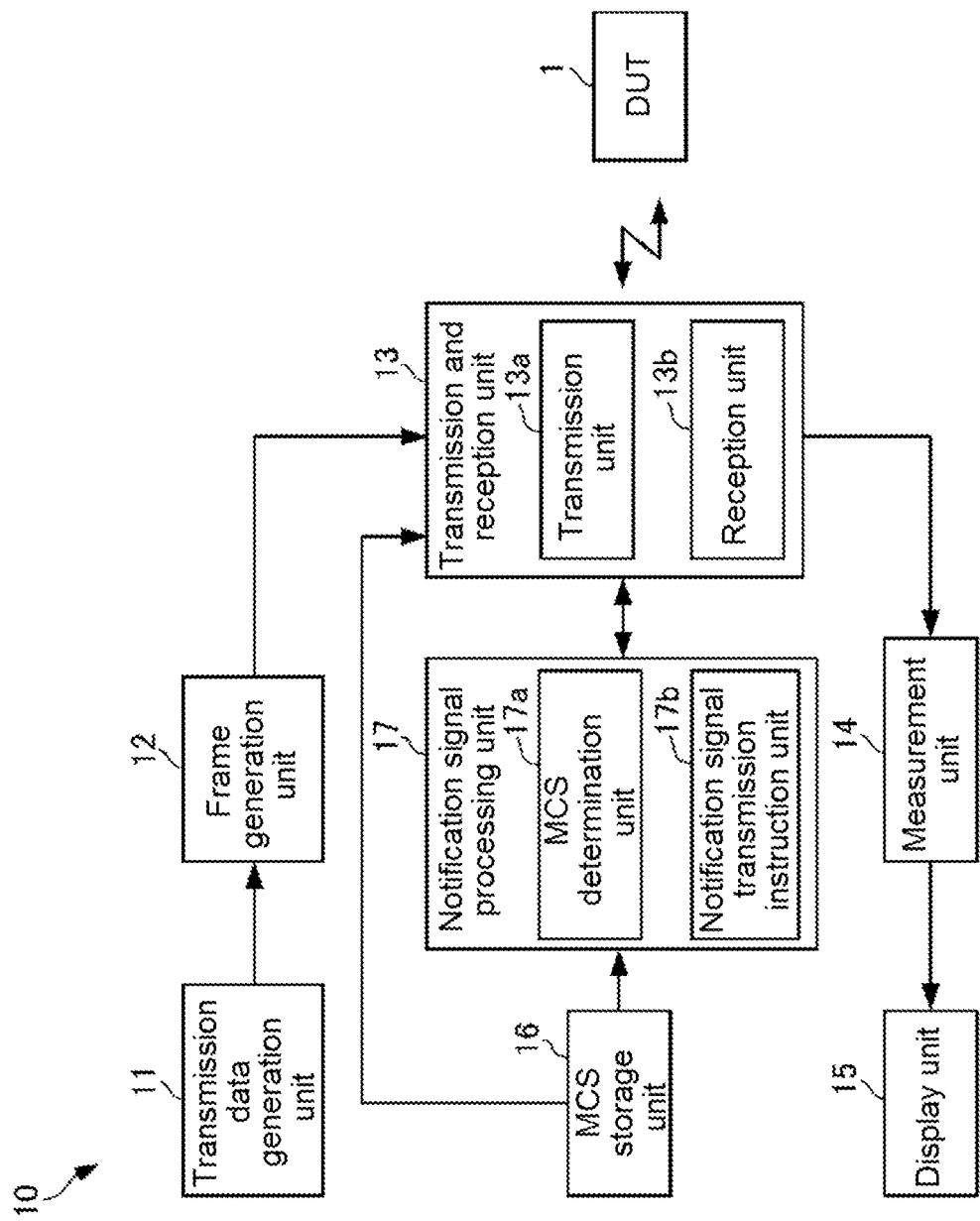
FIG. 5 is a block configuration diagram in an embodiment of a measurement device according to the present invention.

Therefore, in order to solve this problem, the measurement device in this embodiment has the configuration illustrated in FIG. 5.

That is, as illustrated in FIG. 5, the measurement device 10 in the embodiment measures the DUT 1 serving as the device under measurement by performing wireless communication with DUT 1. In the embodiment, it is assumed that the measurement device 10 operates as a wireless LAN master (AP: Access Point) and the DUT 1 operates as a wireless LAN slave (STA: STAtion), but the present invention is not limited thereto. The measurement device 10 may operate as a wireless LAN slave, and the DUT 1 may operate as a wireless LAN master. Further, it is assumed that the measurement device 10 communicates with the DUT 1 on the basis of a communication standard conforming to IEEE802.11ac.

In a case where the DUT 1 transmits a frame generated using a predetermined modulation scheme and a predetermined coding rate to the measurement device 10 serving as a transmission destination and then receives a notification signal indicating that the frame has been received by the measurement device 10, the DUT 1 retransmits a frame in which the value of the MCS index is further decreased so that the probability of delivery to the measurement device 10 increases.

Specifically, for example, when the DUT 1 has not received the notification signal of the frame transmitted initially in VHT-MCS 9, the DUT 1 retransmits a frame in which the value of the MCS index is decreased to VHT-MCS 8. Further, in a case where the DUT 1 has not received a notification signal, the DUT 1 performs an operation of retransmitting the frame in which the value of the MCS index has been decreased to VHT-MCS 7.

The measurement device 10 includes a transmission data generation unit 11, a frame generation unit 12, transmission and reception unit 13, a measurement unit 14, a display unit 15, an MCS storage unit 16, and a notification signal processing unit 17. This measurement device 10 includes a microcomputer including, for example, a CPU, a ROM, a RAM, and an input and output circuit to which various interfaces are connected. The measurement device 10 causes the microcomputer to function as each functional unit of the measurement device 10 by causing a control program stored in the ROM in advance to be executed.

The transmission data generation unit 11 generates transmission data set by the user and outputs the transmission data to the frame generation unit 12.

The frame generation unit 12 generates (forms) a frame including the data from the transmission data generation unit 11 and outputs the frame to the transmission and reception unit 13.

The transmission and reception unit 13 includes a transmission unit 13a and a reception unit 13b, and establishes a wireless communication connection with the DUT 1 on the basis of a communication standard conforming to IEEE 802.11ac. Further, after establishing the wireless communication connection, the transmission and reception unit 13 transmits or receives various types of data regarding the measurement to or from the DUT 1.

Although not illustrated, the transmission unit 13a includes an encoding processing circuit, a modulation circuit, a digital analog converter (DAC), an up-converter, a transmission antenna, and the like. The transmission unit 13a performs a process such as digital modulation or up-conversion on the frame generated by the frame generation unit 12, and transmits a resultant frame to the DUT 1 via the antenna. The transmission unit 13a is an example of notification signal processing means.

Although not illustrated, the reception unit 13b includes a reception antenna, a down-converter, an analog to digital converter (ADC), a demodulation circuit, a decoding processing circuit, and the like. The reception unit 13b extracts data under measurement of the measurement target from a frame determined to be a measurement target by an MCS determination unit 17a to be described below among frames received from the DUT 1, and outputs the data under measurement to the measurement unit 14. This reception unit 13b is an example of frame reception means.

In the embodiment, the frame that the reception unit 13b receives for measurement from the DUT 1 is set as a ping reply frame that the DUT 1 transmits in response to a ping request frame that the transmission unit 13a has transmitted to the DUT 1. This ping reply frame has a configuration illustrated in FIG. 6, for example.

Figure 6:
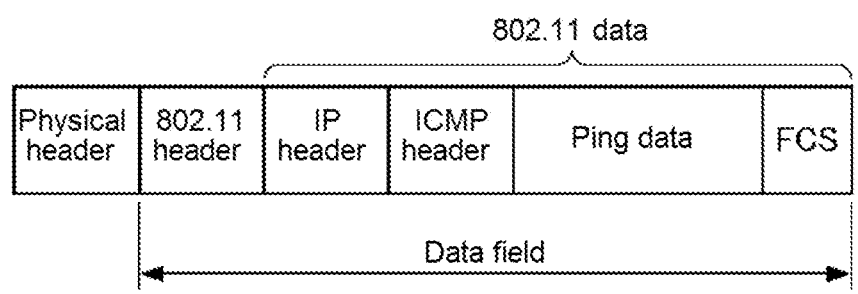
FIG. 6 is a diagram illustrating a configuration example of a ping reply frame in an embodiment of a measurement device according to the present invention.

That is, as illustrated in FIG. 6, the ping reply frame received from the DUT 1 includes a physical header and a data field. The physical header includes information on the MCS index.

The data field includes an 802.11 header and 802.11 data. The 802.11 data includes an Internet protocol (IP) header, an Internet control message packet (ICNP) header, ping data, and a frame check sequence (FCS).

The ping data includes data of a ping command, and data for transmission characteristic measurement. For example, the data for transmission characteristic measurement includes a data pattern such as "0000 . . . ", "0101 . . . ", and "1010 . . . ", and is data set y a user for measurement of predetermined transmission characteristics. Using the data pattern, the measurement device 10 can recognize a data pattern in which it is easy for an error occur in transmission characteristic evaluation of the DUT 1.

Referring back to FIG. 5, when the data under measurement of the measurement target is received by the reception unit 13b, the measurement unit 14 receives the data under measurement, performs measurement of the transmission characteristic of the DUT 1 on the basis of measurement conditions set by the user, and outputs a measurement result to the display unit 15. Specifically, the measurement unit 14 can measure, for example, transmission power, error vector magnitude (EVM), constellation, and the like as transmission characteristics of the DUT 1. The measurement unit 14 is an example of measurement means.

The display unit 15 displays the measurement result obtained by the measurement unit 14.

The MCS storage unit 16 stores information on the MCS index input by the user operating an operation unit (not illustrated).

The information on the MCS index stored in the MCS storage unit 16 by the user includes information on an MCS index that is used when the transmission and reception unit 13 establishes a wireless communication connection with the DUT 1 (hereinafter referred to as "MCS index for connection establishment"), and information on a predetermined MCS index for comparison with an MCS index included in the frame received from the DUT 1 (hereinafter referred to as "received MCS index") after the wireless communication connection. Information on the MCS index for connection establishment and the MCS index for comparison is provided to the transmission and reception unit 13 and the notification signal processing unit 17.

The notification signal processing unit 17 includes an MCS determination unit 17a, and a notification signal transmission instruction unit 17b.

The MCS determination unit 17a compares the MCS index for comparison stored in the MCS storage unit 16 with the received MCS index included in the frame received from the DUT 1 to determine whether or not both match. The MCS determination unit 17a outputs an MCS index match signal indicating that both match to the notification signal transmission instruction unit 17b when the MCS determination unit 17a determines that both match, and transmits an MCS index mismatch signal indicating that both do not match to the notification signal transmission instruction unit 17b when the MCS determination unit 17a determines that both do not match. The MCS determination unit 17a is an example of determination means.

When the notification signal transmission instruction unit 17b establishes a wireless communication connection with the DUT 1, the notification signal transmission instruction unit 17b instructs the transmission unit 13a to output a notification signal to the DUT 1 each time the reception unit 13b receives the frame transmitted from the DUT 1.

Further, when the frame received from the DUT 1 after the wireless communication connection is measured, the notification signal transmission instruction unit 17b instructs the transmission unit 13a to transmit the notification signal to the DUT 1 only when the MCS index match signal is input from the MCS determination unit 17a.

As described above, when the DUT 1 according to the embodiment does not receive the notification signal from the measurement device 10 after transmitting a certain frame, the DUT 1 decreases the value of the MCS index and retransmits the frame so that delivery probability is increased.

Therefore, since the measurement device 10 does not output the notification signal to the DUT 1 when the value of the received MCS index included in the frame received from the DUT 1 after the wireless communication connection is greater than the value of the MCS index for comparison, and outputs the notification signal to the DUT 1 when the value of the received MCS index matches the value of the MCS index for comparison, it is possible to measure a desired arbitrary value frame as a measurement target.

Figure 7:
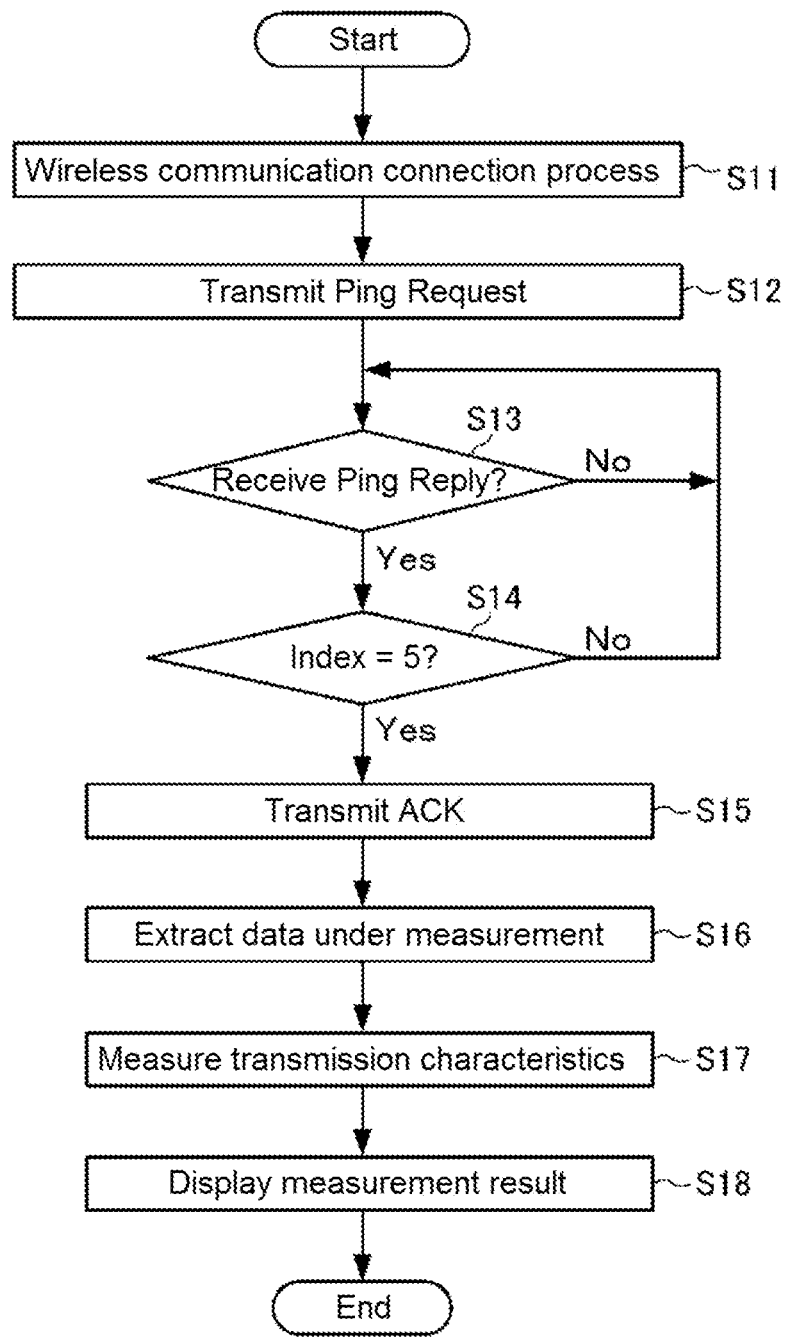
FIG. 7 is a flowchart in an embodiment of a measurement device according to the present invention.

Next, an operation of the measurement device 10 in the embodiment will be described with reference to FIG. 7. In the following description of the operation, it is assumed that the DUT 1 first transmits a frame including information on the received MCS index=7, and decreases the value of the received MCS index by one when the notification signal is not received in response to the frame. Further, it is assumed that the MCS index for comparison=5 (a predetermined condition) is stored in the MCS storage unit 16 according to a setting of the user.

The transmission and reception unit 13 performs a wireless communication connection process including an authentication process and a call connection establishment process with the DUT 1 on the basis of the communication standard conforming IEEE802.11ac (step S11). In the wireless communication connection process, the transmission and reception unit 13 can notify the DUT 1 of the MCS index for connection establishment stored in the MCS storage unit 16, and receive a frame generated on the basis of the MCS index for connection establishment from the DUT 1. Note that the value of the MCS index for connection establishment and the value of the MCS index for comparison may be the same.

After the wireless communication connection process, the transmission unit 13a transmits a ping request frame to the DUT 1 (step S12).

The reception unit 13b determines whether or not a ping reply frame has been received in response to the ping request frame (step S13).

In step S13, when it is not determined that the ping reply frame has been received, step S13 is repeated.

On the other hand, when it is determined in step S13 that the ping reply frame has been received, the MCS determination unit 17a determines whether the value of the received MCS index is five (the value of the MCS index for comparison) (step S14). That is, the MCS determination unit 17a determines whether or not the received ping reply frame is a measurement target.

In step S14, when it is not determined that the value of the received MCS index is five, the process returns to step S13. That is, the transmission and reception unit 13 does not transmit the notification signal indicating that the frame has been received to the DUT 1.

On the other hand, when it is determined in step S14 that the value of the received MCS index is five, the transmission unit 13a transmits an ACK frame (the notification signal) to the DUT 1 (step S15).

The reception unit 13b extracts the data under measurement from the ping reply frame in which it is determined that the value of the received MCS index is five in step S14 (step S16), and outputs the data under measurement to the measurement unit 14.

The measurement unit 14 receives the data under measurement from the reception unit 13b, and performs transmission measurement designated by the user (step S17).

The display unit 15 displays the measurement result measured by the measurement unit 14 on a screen (step S18).

Figure 8:
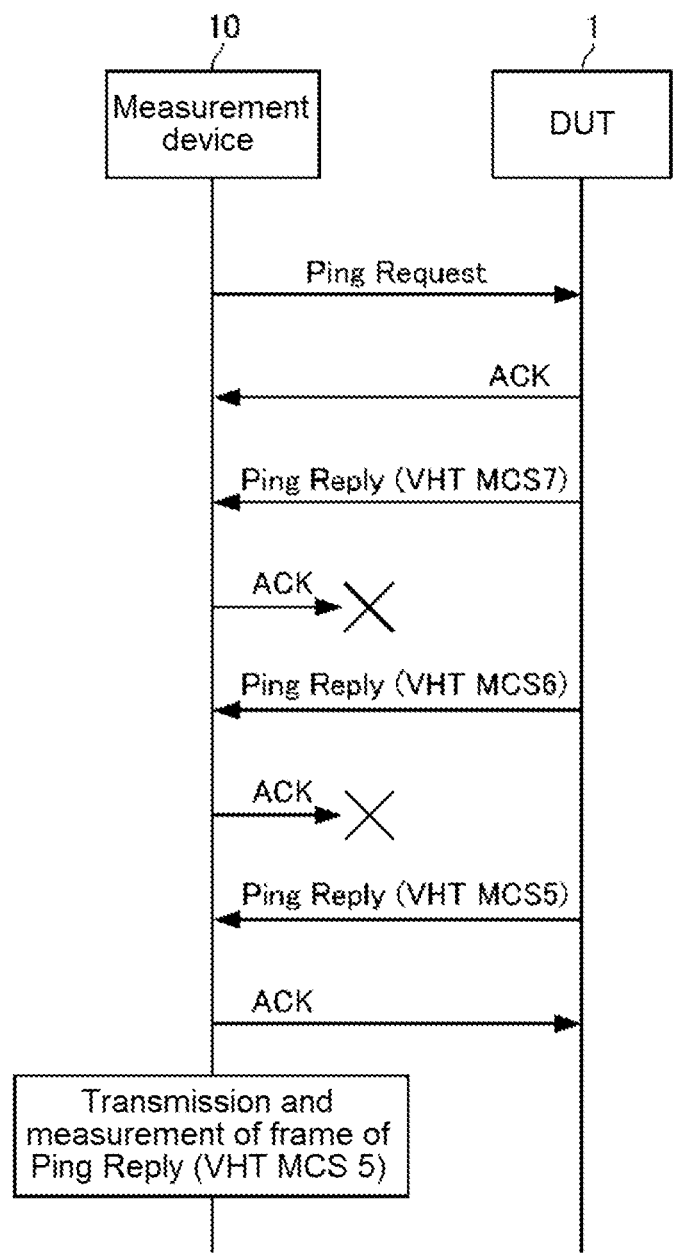
FIG. 8 is an illustrative diagram of transmission and reception of a frame in steps S12 to S15 in the flowchart illustrated in FIG. 7.

Next, transmission and reception of the frames in steps S12 to S15 described above will be specifically described with reference to FIG. 8.

The measurement device 10 transmits a ping request frame to the DUT 1. When the DUT 1 receives the ping request frame, the DUT 1 transmits an ACK frame indicating that the DUT 1 has received the ping request frame to the measurement device 10.

Subsequently, the DUT 1 transmits the ping reply frame (VHT-MCS 7) responding to the ping request frame to the measurement device 10. The parenthesis indicates that this ping reply frame is generated in VHT-MCS 7.

The measurement device 10 receives the ping reply frame (VHT-MCS 7), but since the value of the received MCS index is not five, the measurement device 10 does not transmit the ACK frame to the DUT 1.

Subsequently, the DUT 1 retransmits the ping reply frame (VHT-MCS 6), and the measurement device 10 receives the ping reply frame (VHT-MCS 6), but since the value of the received MCS index is not five, the measurement device 10 does not transmit the ACK frame to the DUT 1.

Further, the DUT 1 retransmits the ping reply frame (VHT-MCS 5). The measurement device 10 receives the ping reply frame (VHT-MCS 5), and since the value of the received MCS index of the frame is five (satisfies the predetermined condition), the measurement device 10 transmits the ACK frame to the DUT 1 and measures transmission characteristics with the ping reply frame (VHT-MCS 5) as the frame of the measurement target.

As described above, since the measurement device 10 in the embodiment does not transmit the notification signal to the DUT 1 until the value of the received MCS index matches or is equal to or smaller than the value of the MCS index for comparison, the DUT continuously retransmits the frame while decreasing the value of the received MCS index so that the delivery probability is increased until the DUT 1 receives the notification signal.

As a result, when the value of the received MCS index matches or is smaller than the value of the MCS index for comparison, the measurement device 10 in the embodiment can set the frame as the measurement target.

Therefore, the measurement device 10 in the embodiment can measure the characteristics of the DUT 1 with an arbitrary modulation scheme or an arbitrary coding rate desired by the user.

Note that in the above-described embodiment, the configuration in which it is determined whether or not the notification signal is transmitted to the DUT 1 on the basis of the MCS index in which the modulation scheme and the coding rate are combined has been adopted, but the present invention is not limited thereto. Even when configuration in which it is determined whether or not the notification signal is transmitted to the DUT 1 on the basis of at least one of the modulation scheme and the coding rate satisfies a predetermined condition is adopted, the same effects as those described above can be obtained.

Further, in the above-described embodiment, the measurement device 10 communicates with the DUT 1 on the basis of the communication standard conforming to IEEE802.11ac, but the present invention is not limited thereto, and the same effects as those described above can be obtained as long as the measurement device 10 communicates with the DUT 1 on the basis of the communication standard conforming to IEEE802.11.

Modification Example

In the above-described embodiment, the DUT 1 that sequentially decreases the value of the MCS index and retransmits the frame when the notification signal of the transmitted frame is not received has been described by way of example.

Meanwhile, some DUTs retransmit the frame decreased to MCS 4, for example, when the DUTs do not receive a notification signal of a frame transmitted in MCS 6. Further, for example, there is also a DUT that receives a frame request signal requesting a new frame after receiving the notification signal of the frame transmitted in MCS 4 and retransmits the frame increased to MCS 6. Hereinafter, a measurement device 20 in which such a type of DUT is DUT 2, and the DUT 2 is a measurement target will be described.

Figure 9:
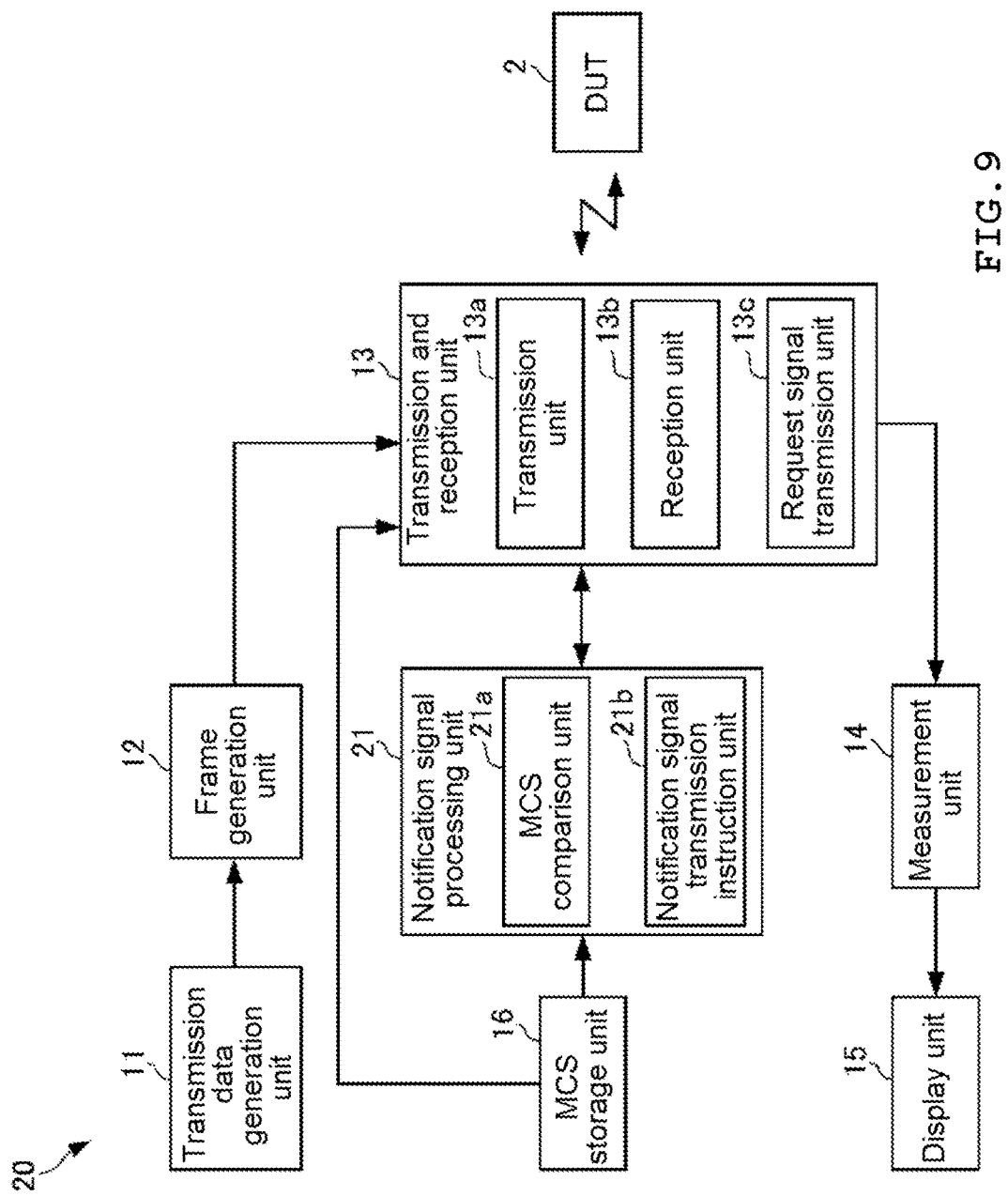
FIG. 9 is a block configuration diagram of a modification example of the embodiment of the measurement device according to the present invention.

As illustrated in FIG. 9, the measurement device 20 in the modification example of the embodiment is different from the measurement device 10 illustrated in FIG. 5 in that a notification signal processing unit 21 is included in place of the notification signal processing unit 17, and the transmission and reception unit 13 includes a request signal transmission unit 13c. Note that the same configurations as those described with reference to FIG. 5 are denoted with the same reference numerals, and description thereof may be omitted.

The notification signal processing unit 21 includes an MCS comparison unit 21a and a notification signal transmission instruction unit 21b.

The MCS comparison unit 21a compares the MCS index for comparison stored in the MCS storage unit 16 with the received MCS index included in the frame received from the DUT 2. The MCS comparison unit 21a is an example of comparison means.

Further, the MCS comparison unit 21a outputs predetermined value non-excess signal indicating that the value of the received MCS index is smaller than the value of the MCS index for comparison to the notification signal transmission instruction unit 21b when the MCS comparison unit 21a determines that the value of the received MCS index is smaller than the value of the MCS index for comparison, and outputs a predetermined value excess signal indicating that the value of the received MCS index exceeds the value of the MCS index for comparison to the notification signal transmission instruction unit 21b when the MCS comparison unit 21a determines that the value of the received MCS index exceeds the value of the MCS index for comparison.

Further, when the MCS comparison unit 21a determines that the value of the received MCS index and the value of the MCS index for comparison match, the MCS comparison unit 21a outputs an MCS index match signal indicating that the value of the received MCS index and the value of the MCS index for comparison match, to the notification signal transmission instruction unit 21b.

When the notification signal transmission instruction unit 21b establishes a wireless communication connection with the DUT 2, the notification signal transmission instruction unit 21b instructs the transmission unit 13a to output a notification signal to the DUT 2 each time the reception unit 13b receives the frame transmitted from the DUT 2.

Further, when the notification signal transmission instruction unit 21b measures the frame received from the DUT 2 after the wireless communication connection, the notification signal transmission instruction unit 21b instructs the transmission unit 13a to output the notification signal to the DUT 2 only when the predetermined value non-excess signal or the MCS index match signal is received from the MCS comparison unit 21a.

Further, when the notification signal transmission instruction unit 21b receives the predetermined value non-excess signal from the MCS comparison unit 21a and after the transmission unit 13a transmits the notification signal, the notification signal transmission instruction unit 21b instructs the request signal transmission unit 13c to output a frame request signal for requesting the frame to the DUT 2.

The request signal transmission unit 13c transmits the frame request signal for requesting a frame (referred to as a ping request frame in the embodiment) to the DUT 2. The request signal transmission unit 13c is an example of request signal transmission means.

Figure 10:
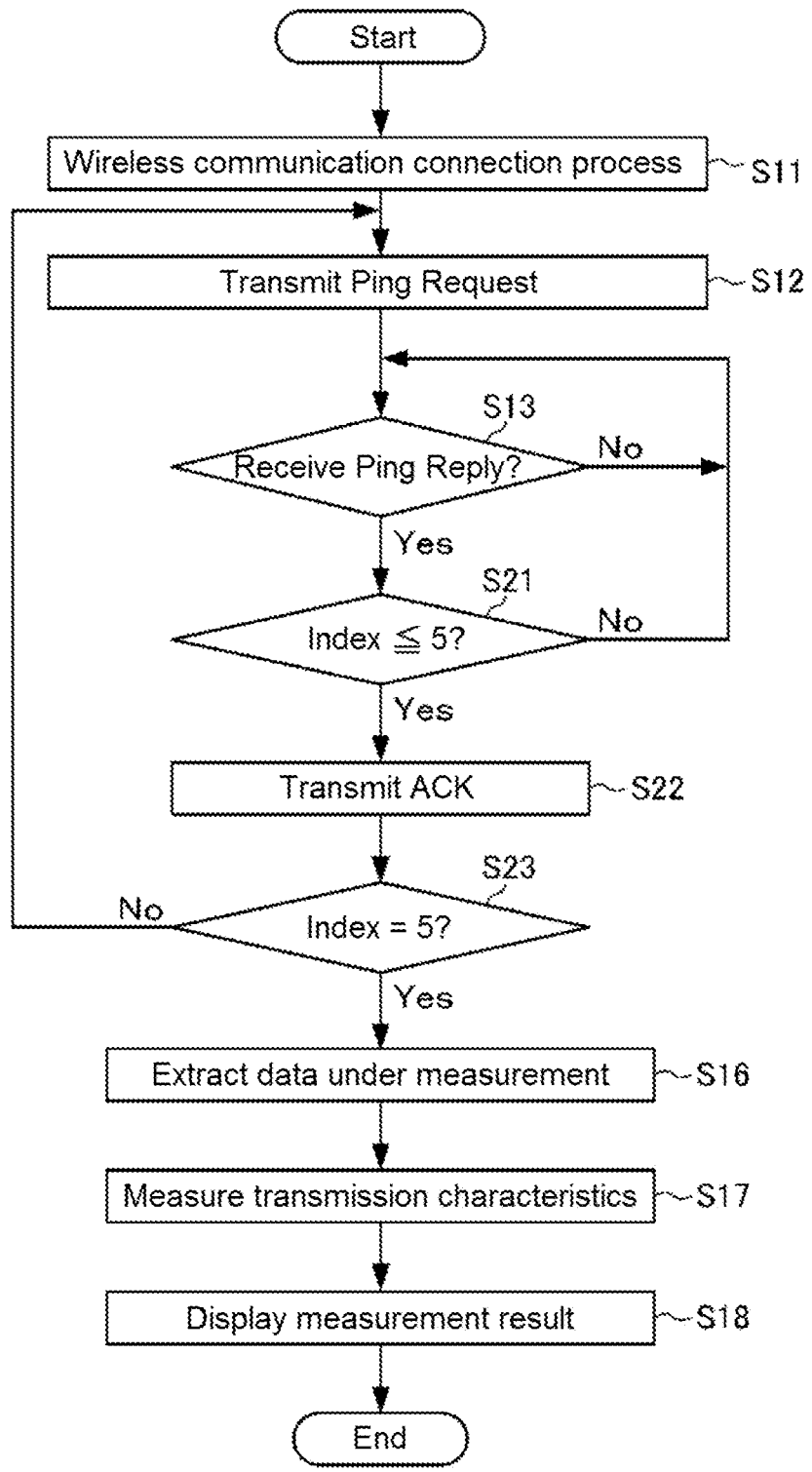
FIG. 10 is a flowchart of the modification example of the embodiment of the measurement device according to the present invention.

Next, an operation of the measurement device 20 in the modification example will be described with reference to FIG. 10. Note that operations that are the same as the respective steps illustrated in FIG. 7 are denoted with the same reference numerals, and description thereof may be omitted.

In a case where it is determined in step S13 that the ping reply frame has been received, the MCS comparison unit 21a determines whether the value of the received MCS index is equal to or smaller than five (the value of the MCS index for comparison) (step S21).

In a case where it is not determined in step S21 that the value of the received MCS index is equal to or smaller than five, a predetermined value excess signal is output from the MCS comparison unit 21*a* to the notification signal transmission instruction unit 21*b*, and the process returns to step S13. That is, the transmission and reception unit 13 does not transmit a notification signal indicating that the frame has been received, to the DUT 2.

On the other hand, when it is determined in step S21 that the value of the received MCS index equal to or smaller than five, the predetermined value non-excess signal or the MCS index match signal is output from the MCS comparison unit 21*a* to the notification signal transmission instruction unit 21*b*, and the transmission unit 13*a* transmits an ACK frame (a notification signal) to the DUT 2 (step S22).

The MCS comparison unit 21*a* determines whether or not the value of the received MCS index is five (step S23). That is, the MCS comparison unit 21*a* determines whether or not the received ping reply frame is a measurement target.

In a case where it is determined in step S23 that the value of the received MCS index is five, the reception unit 13*b* extracts the data under measurement from the ping reply frame in which it is determined that the value of the received MCS index is five in step S23 (step S16), and outputs the data under measurement to the measurement unit 14.

On the other hand, in a case where it is determined in step S23 that the value of the received MCS index is not five, the process returns to step S12. That is, the measurement device 20 causes the request signal transmission unit 13*c* to transmit the ping request frame (the frame request signal) to the DUT 2, and waits for a frame in which the value of the received MCS index is five.

As described above, the measurement device 20 does not output the notification signal to the DUT 2 in a case where the value of the received MCS index included in the frame received from the DUT 2 after the wireless communication connection is greater than the value of the MCS index for comparison.

Further, the measurement device 20 outputs a notification signal when the value of the received MCS index is equal to or smaller than the value of the MCS index for comparison, and sets only the frame in which both match as the measurement target.

Therefore, the measurement device 20 in the modification example can measure a frame with an arbitrary desired value as the measurement target.

As described above, the measurement device and the measurement method according to the present invention have the effect of being able to measure the characteristics of the device under measurement with an arbitrary modulation scheme or an arbitrary coding rate, and are useful as a measurement device and a measurement method for measuring a device under measurement that operates on the basis of a wireless LAN communication standard.

DESCRIPTION OF REFERENCE NUMERALS AND SIGNS

1 DUT (device under measurement)
10 measurement device
11 transmission data generation unit
12 frame generation unit
13 transmission and reception unit
13*a* transmission unit (notification signal processing means)
13*b* reception unit (frame reception means)
13*c* request signal transmission unit (request signal transmission means)
14 measurement unit (measurement means)
15 display unit
16 MCS storage unit
17 notification signal processing unit
17*a* MCS determination unit (determination means)
17*b*, 21*b* notification signal transmission instruction unit
21*a* MCS comparison unit (comparison means)

What is claimed is:

1. A measurement device comprising:
    frame reception circuit configured to receive a frame transmitted from a device under measurement, wherein the device under measurement transmits a frame generated using a predetermined modulation scheme and a predetermined coding rate to a transmission destination, and when the device under measurement does not receive a notification signal indicating that the frame has been received by the transmission destination, the device under measurement retransmits a frame in which at least one of the modulation scheme and the coding rate has been changed so that a probability of delivery to the transmission destination is increased;
    determination circuit configured to determine whether or not the modulation scheme and the coding rate of the frame received by the frame reception circuit satisfy a predetermined condition;
    notification signal processing circuit configured to transmit the notification signal to the device under measurement when the determination circuit determines that the predetermined condition is satisfied and not transmitting the notification signal when the determination circuit determines that the predetermined condition is not satisfied; and
    measurement circuit configured to measure data included in the frame transmitted from the device under measurement with the modulation scheme and the coding rate, the frame being determined to satisfy the predetermined condition.

2. The measurement device according to claim 1,
    wherein the frame transmitted by the device under measurement includes information on a modulation and coding scheme index with which the modulation scheme and the coding rate are associated,
    the device under measurement retransmits a frame in which a value of the modulation and coding scheme index has been changed to a smaller value when the device under measurement does not receive the notification signal,
    the determination circuit determines whether the value of the modulation and coding scheme index matches a predetermined value,
    the notification signal processing circuit transmits the notification signal to the device under measurement when the determination circuit determines that the value of the modulation and coding scheme index matches the predetermined value, and
    the measurement circuit measures the data included in the frame in which the determination circuit determines that the value of the modulation and coding scheme index matches the predetermined value.

3. The measurement device according to claim 1,
    wherein the frame reception circuit receives, as the frame, a response frame that the device under measurement transmits according to a ping command, and the measurement circuit measures the data under measurement included in the response frame.

4. The measurement device according to claim 1, wherein the frame reception circuit receives a frame conforming to the IEEE 802.11 standard as the frame.

5. A measurement device comprising:
frame reception circuit configured to receive a frame transmitted from a device under measurement, wherein the device under measurement transmits, to a transmission destination according to a frame request signal for requesting the frame, a frame generated on the basis of a value of a modulation and coding scheme index with which a modulation scheme and a coding rate are associated, and when the device under measurement does not receive a notification signal indicating that the frame has been received by the transmission destination, retransmits a frame in which the value of the modulation and coding scheme index has been changed;
measurement circuit configured to measure data included in the frame;
comparison circuit configured to compare the modulation and coding scheme index of the frame received by the frame reception circuit with a predetermined value;
notification signal processing circuit configured to transmit the notification signal to the device under measurement when the comparison circuit determines that the modulation and coding scheme index is equal to or smaller than the predetermined value, and not transmitting the notification signal when the comparison circuit determines that the modulation and coding scheme index is not equal to or smaller than the predetermined value;
request signal transmission circuit configured to transmit the frame request signal to the device under measurement when the comparison circuit determines that the modulation and coding scheme index is smaller than the predetermined value; and
measurement circuit configured to measure data included in the frame when the comparison circuit determines that the value of the modulation and coding scheme index matches the predetermined value.

6. A measurement method comprising:
a frame reception step of receiving a frame transmitted from a device under measurement, wherein the device under measurement transmits a frame generated using a predetermined modulation scheme and a predetermined coding rate to a transmission destination, and when the device under measurement does not receive a notification signal indicating that the frame has been received by the transmission destination, the device under measurement retransmits a frame in which at least one of the modulation scheme and the coding rate has been changed so that a probability of delivery to the transmission destination is increased;
a determination step of determining whether or not the modulation scheme and the coding rate of the frame received in the frame reception step satisfy a predetermined condition, transmitting the notification signal to the device under measurement when it is determined that the predetermined condition is satisfied, and not transmitting the notification signal when it is determined that the predetermined condition is not satisfied; and
a measurement step of measuring characteristics of the frame transmitted from the device under measurement with the modulation scheme and the coding rate, the frame being determined to satisfy the predetermined condition in the determination step.

7. The measurement method according to claim 6, wherein the frame transmitted by the device under measurement includes information on a modulation and coding scheme index with which the modulation scheme and the coding rate are associated,
the device under measurement retransmits a frame in which a value of the modulation and coding scheme index has been changed to a smaller value when the device under measurement does not receive the notification signal,
the determination step includes determining whether the value of the modulation and coding scheme index matches a predetermined value, and transmitting the notification signal to the device under measurement when it is determined that the value of the modulation and coding scheme index matches the predetermined value, and
the measurement step includes measuring data included in the frame in which it is determined in the determination step that the value of the modulation and coding scheme index matches the predetermined value.

8. The measurement method according to claim 6, wherein the frame reception step includes receiving, as the frame, a response frame that the device under measurement transmits according to a ping command, and
the measurement step includes measuring data included in the response frame.

9. The measurement method according to claim 6, wherein the frame reception step includes receiving a frame conforming to the IEEE 802.11 standard as the frame.

10. A measurement method comprising:
a frame reception step of receiving a frame transmitted from a device under measurement, wherein the device under measurement transmits, to a transmission destination according to a frame request signal for requesting the frame, a frame generated on the basis of a value of a modulation and coding scheme index with which a modulation scheme and a coding rate are associated, and when the device under measurement does not receive a notification signal indicating that the frame has been received by the transmission destination, retransmits a frame in which the value of the modulation and coding scheme index has been changed;
a comparison step of comparing the modulation and coding scheme index of the frame received in the frame reception step with a predetermined value;
a notification signal processing step of transmitting the notification signal to the device under measurement when it is determined in the comparison step that the modulation and coding scheme index is equal to or smaller than the predetermined value;
a request signal transmission step of transmitting the frame request signal to the device under measurement when it is determined in the comparison step that the modulation and coding scheme index is smaller than the predetermined value; and
a measurement step of measuring data included in the frame when it is determined in the comparison step that the value of the modulation and coding scheme index matches the predetermined value.

* * * * *